(12) United States Patent
Kashiwagi

(10) Patent No.: US 7,614,649 B2
(45) Date of Patent: Nov. 10, 2009

(54) AIRBAG SYSTEM

(75) Inventor: Daisuke Kashiwagi, Tokyo (JP)

(73) Assignee: Takata Corporation, Tokyo (JP)

( * ) Notice: Subject to any disclaimer, the term of this patent is extended or adjusted under 35 U.S.C. 154(b) by 198 days.

(21) Appl. No.: 11/584,629

(22) Filed: Oct. 23, 2006

(65) Prior Publication Data

US 2007/0090631 A1 Apr. 26, 2007

(30) Foreign Application Priority Data

Oct. 25, 2005 (JP) .............................. 2005-309235

(51) Int. Cl.
*B60R 21/16* (2006.01)
*B60R 21/20* (2006.01)
*B60R 21/231* (2006.01)

(52) U.S. Cl. ................. 280/730.1; 280/728.2; 280/740; 280/743.1

(58) Field of Classification Search ................. 180/271; 701/45; 280/730.2, 728.1, 728.2, 740, 743.1, 280/730.1; 296/68.1
See application file for complete search history.

(56) References Cited

U.S. PATENT DOCUMENTS

| | | | | |
|---|---|---|---|---|
| 5,632,506 A * | 5/1997 | Shellabarger | ............ | 280/743.1 |
| 5,667,241 A * | 9/1997 | Bunker et al. | ............ | 280/730.2 |
| 5,944,342 A * | 8/1999 | White | ........................ | 280/729 |
| 5,997,036 A * | 12/1999 | Hamada | ................... | 280/743.1 |
| 6,543,803 B1 * | 4/2003 | Harada et al. | ............ | 280/730.2 |
| 6,669,226 B2 * | 12/2003 | Fowler et al. | ............. | 280/728.2 |
| 6,715,789 B2 | 4/2004 | Takimoto et al. | | |
| 6,846,005 B2 * | 1/2005 | Ford et al. | ............... | 280/728.2 |
| 7,055,858 B2 * | 6/2006 | Takimoto et al. | ......... | 280/743.1 |
| 7,152,876 B2 * | 12/2006 | Hofmann | ................. | 280/743.1 |
| 7,195,280 B2 * | 3/2007 | Wheelwright et al. | ..... | 280/743.1 |
| 7,226,077 B2 * | 6/2007 | Abe | ........................... | 280/736 |
| 7,314,231 B2 * | 1/2008 | Abe et al. | ................. | 280/730.1 |
| 7,350,801 B2 * | 4/2008 | Nakayama | ............... | 280/730.1 |
| 2002/0190509 A1 | 12/2002 | Higashi | | |
| 2004/0160042 A1 | 8/2004 | Takimoto et al. | | |
| 2005/0110244 A1 | 5/2005 | Wheelwright et al. | | |
| 2005/0248132 A1 * | 11/2005 | Wheelwright | ............... | 280/729 |

FOREIGN PATENT DOCUMENTS

| | | |
|---|---|---|
| DE | 298 07 424 U1 | 10/1998 |
| EP | 1 300 300 A1 | 7/2001 |
| EP | 1 262 378 | 5/2002 |
| EP | 1 510 420 A2 | 3/2004 |
| EP | 1 514 742 A1 | 7/2004 |
| EP | 1 518 762 A1 | 9/2004 |
| JP | H110115673 | 4/1999 |

* cited by examiner

*Primary Examiner*—Ruth Ilan
*Assistant Examiner*—James English
(74) *Attorney, Agent, or Firm*—Manabu Kanesaka

(57) ABSTRACT

A leg airbag system in which the deployment performance of an airbag can be improved by an improvement in air tightness includes a knee airbag for restraining occupant's legs and a gas generator that generates a jet of gas to inflate the knee airbag. A housing section communicates with the knee airbag and houses the gas generator therein. A slit, provided at the housing section, allows the gas generator to be inserted into the housing section. Covers are included that cover the slit from the exterior of the housing section

11 Claims, 4 Drawing Sheets

AIRBAG SYSTEM

BACKGROUND OF THE INVENTION AND RELATED ART STATEMENT

The present invention relates to an airbag system mounted to a vehicle such as a car.

Various airbag systems are generally used for restraining occupants' bodies in a car collision, such as a driver airbag system that inflates and deploys from a rotational center of the steering wheel toward a driver side in a driver seat and a passenger airbag that inflates and deploys from an instrument panel toward a passenger seat side.

One airbag system is a leg airbag system for preventing occupants' legs from colliding with an interior panel and the like in front of the seat and for restraining the vicinity of the knees in order to prevent movement of the lower half of the occupants' bodies toward the front of the vehicle.

The leg airbag system includes an airbag disposed inside the interior panel (in the space on the back of the interior panel), a gas generator for inflating the airbag, and a lid that covers the airbag in a normal state (when the high-speed mobile body such as a car is not in a collision).

Such a leg airbag system may be constructed such that the airbag is disposed in a folded state inside the interior panel, and a lid is mounted so as to cover the folded airbag. When a car, for example, collides head-on with an object, the gas generator generates a jet of gas. The gas is supplied to the airbag to open the lid with the inflation of the airbag, permitting the airbag to expand to an exterior of the interior panel inflating and deploying between the interior panel and the lower legs of the occupant, thereby preventing the occupant's lower legs from striking against the interior panel. Hereinafter, this type of airbag that inflates forward of occupant's legs is referred to as a knee airbag.

One example of the leg airbag system includes a knee airbag manufactured in such a way that a sheet of fabric is folded back substantially at the center. A part of sewing portion of the fabric remains unsewn, and a rim part, except for the unsewn part, is sewn into a bag shape. A gas generator is accommodated in the bag through the unsewn part, and the unsewn part is then sewn with the end of the gas generator adjacent to a connector projected from an insertion opening of the bag (refer to, for example, Japanese Unexamined Patent Application Publication No. 2003-40071 (p. 5, FIG. 5).

The above prior art discloses a basic structure of a leg airbag system including a knee airbag and a gas generator passing through the insertion opening of the knee airbag.

The present disclosure provides an airbag system in which the deployment performance of an airbag may be improved by improvement in air tightness.

SUMMARY OF THE INVENTION

In order to achieve the above object, according to a first aspect, an airbag system includes an airbag configured to restrain an occupant and a gas generator that generates a jet of gas to inflate the airbag. The airbag system includes an insertion opening at the airbag, a gas generator configured to insert into the airbag therethrough; and a covering member that covers the insertion opening from an exterior of the airbag.

According to the first aspect of the disclosure, the gas generator is inserted into an airbag through an insertion opening of the airbag, and the insertion opening is covered with a covering member from the exterior of the airbag. Then, the airbag is folded, housed in the retainer, and is then disposed at an appropriate position of a steering wheel, an instrument panel, and the like.

Covering the gas-generator insertion opening with the covering member improves the air tightness of the airbag thereby preventing gas from leaking through the insertion opening during inflation and deployment of the airbag, thereby improving the deployment performance of the airbag. Furthermore, because the airbag can be deployed by a relatively low-output gas generator, the gas generator can be made compact.

In order to achieve the above object, a second aspect of an airbag system includes an airbag for restraining an occupant and a gas generator that generates a jet of gas to inflate the airbag. The airbag system includes a housing member that communicating with the airbag and houses the gas generator therein. An insertion opening, provided at the housing member, allows the gas generator to be inserted into the airbag therethrough. A covering member is included that covers the insertion opening from the exterior of the housing member.

According to the second aspect, the gas generator is inserted into a housing member through the insertion opening of the housing member communicating with the airbag, and the insertion opening is covered with the covering member from the exterior of the housing member. Then, the airbag is folded, housed in the retainer, and is then disposed at an appropriate position of a steering or an instrument panel. Covering the gas generator insertion opening of the gas generator housing member with the covering member improves the air tightness of the housing member and the airbag communicating therewith. Gas is prevented from leaking through the insertion opening during inflation and deployment of the airbag, thereby improving the deployment performance of the airbag. Furthermore, since the airbag can be inflated by a relatively low-output gas generator, the gas generator can be made compact.

According to a third aspect, the insertion opening is a slit formed in the airbag or the housing member.

The slit-shaped insertion opening can be expanded when the gas generator is inserted to provide a sufficient opening to pass the gas generator therethrough. The opening is closed after the insertion to minimize the opening space, thereby preventing a decrease in tightness.

According to a fourth aspect, the covering member includes a first covering member disposed on one side of the insertion opening and a second covering member disposed on the other side of the insertion opening.

According to the fourth aspect, after the gas generator is inserted into the airbag or the housing member through the insertion opening, the insertion opening is covered with the first covering member disposed on one side of the insertion opening. The insertion opening is then covered with the second covering member disposed on the other side of the insertion opening from the other side. The covering of the insertion opening with the first and second covering members from both sides further increases the air tightness of the airbag.

According to a fifth aspect, the first and second covering members are overlapped so as to twice cover the insertion opening.

According to the fifth aspect, after the gas generator is inserted into the airbag or the housing member through the insertion opening, the insertion opening is twice covered with the first and second covering members overlapping each other. This further increases the air tightness of the airbag.

According to a sixth aspect, at least one of the first and second covering members is integrated with the housing member. Because at least one of the first and second covering members and the housing member are integrated with each other, the number of components may be reduced and the manufacturing process may be simplified in comparison with a case in which the components are manufactured separately.

According to a seventh aspect, the covering member is a fabric made of a material similar to that of the airbag, facilitating fixing the covering member to the airbag, for example, by sewing. Also, this enables the airbag to be folded together with the covering member and housed in the retainer, with the covering member disposed at the airbag.

An eighth aspect includes a retaining member for retaining the gas generator when the gas generator is housed in the airbag or the housing member. The retaining member is fixed to a retainer in such a manner that a fixing member secured to the retaining member is passed through openings provided on the airbag, the housing member, the covering member, and the retainer in a protruding condition, and is then tightened.

According to the eighth aspect, when the gas generator is housed in the airbag or the housing member, the fixing member (e.g., a stud bolt) secured to a retaining member for retaining the gas generator is passed through bolt insertion openings of the airbag, the housing member, or the covering member, and the opening of the retainer. The fixing member is then tightened with, for example, a nut to thereby fix the retaining member to the retainer. The fixing of the retaining member to the retainer enables the covering member that covers the insertion opening to be clamped between the retaining member and the retainer and to be pushed against the airbag or the housing member, further improving the air tightness of the airbag.

Accordingly, the deployment performance of an airbag can be improved by an improvement in air tightness.

DETAILED DESCRIPTION OF PREFERRED EMBODIMENTS

Some embodiments of the present disclosure will be described with reference to the drawings, and include an airbag (hereinafter, referred to as a knee airbag) that inflates forward of occupants' legs in a collision.

Figure 1:
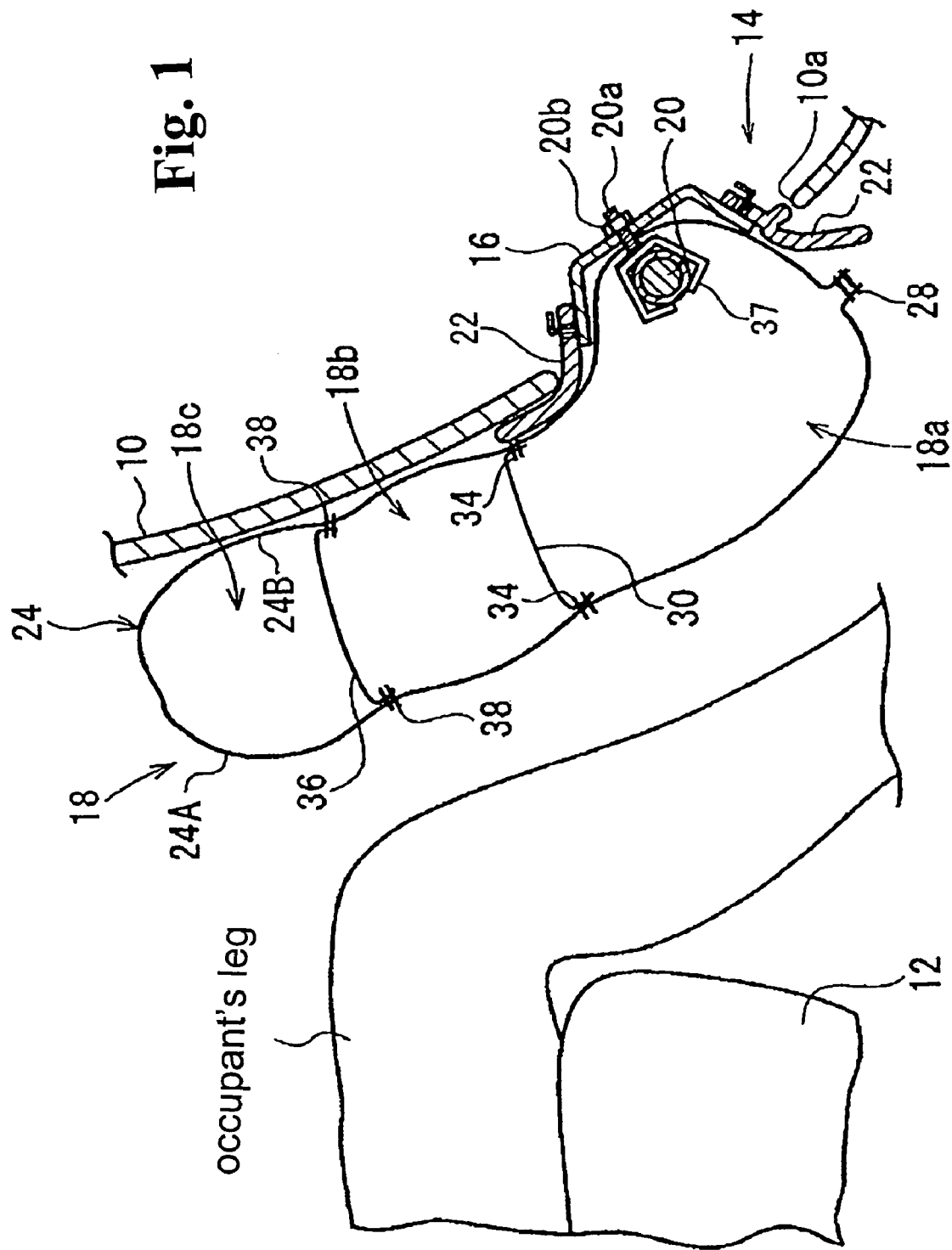
FIG. 1 is a sectional view of the vicinity in front of a vehicle seat, showing the inflating state of a knee airbag of a leg airbag system.
Figure 2:
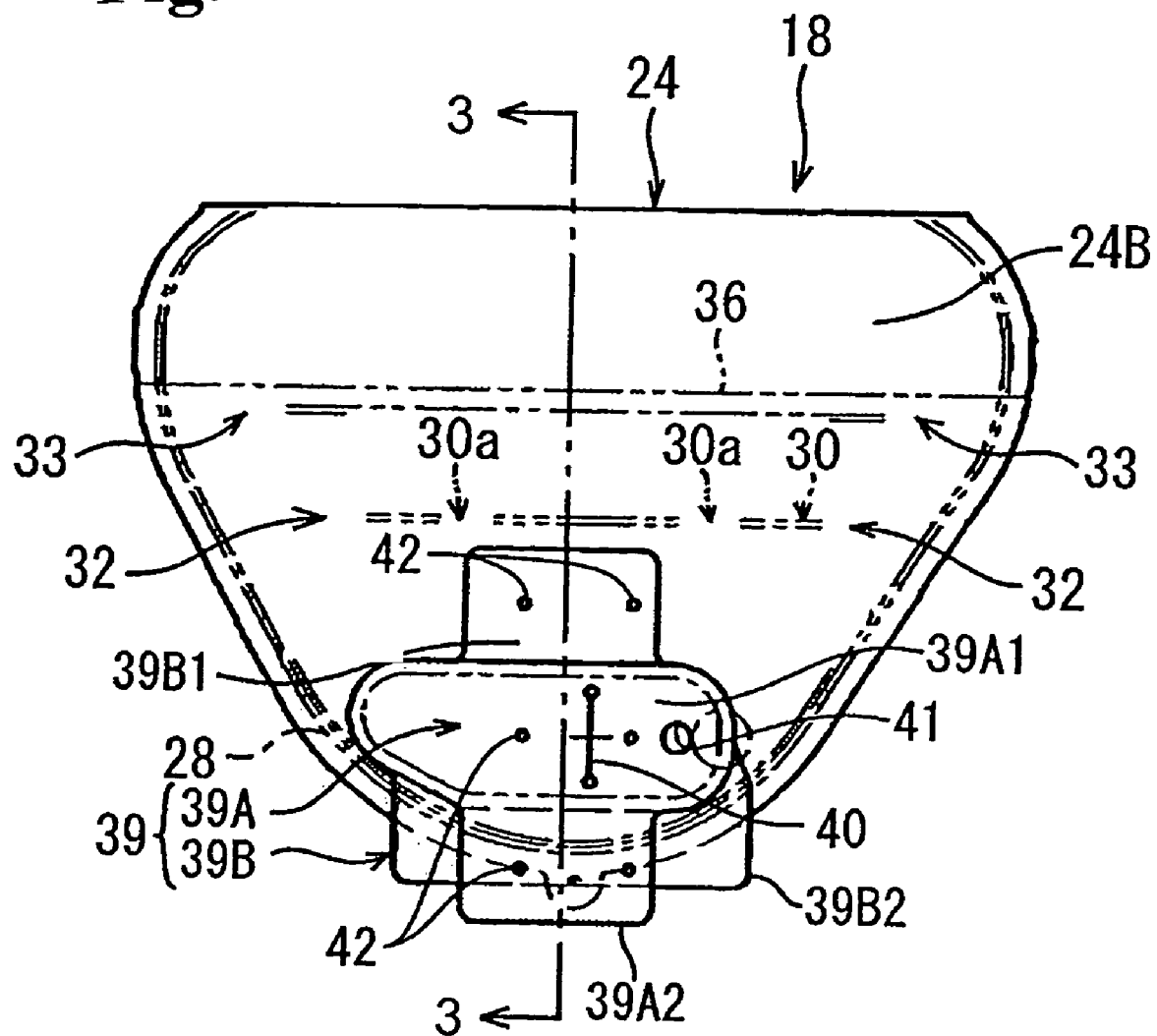
FIG. 2 is a front view (plan view) of the knee airbag of the leg airbag system according to the air bag of FIG. 1, viewed from the interior panel.
Figure 3:
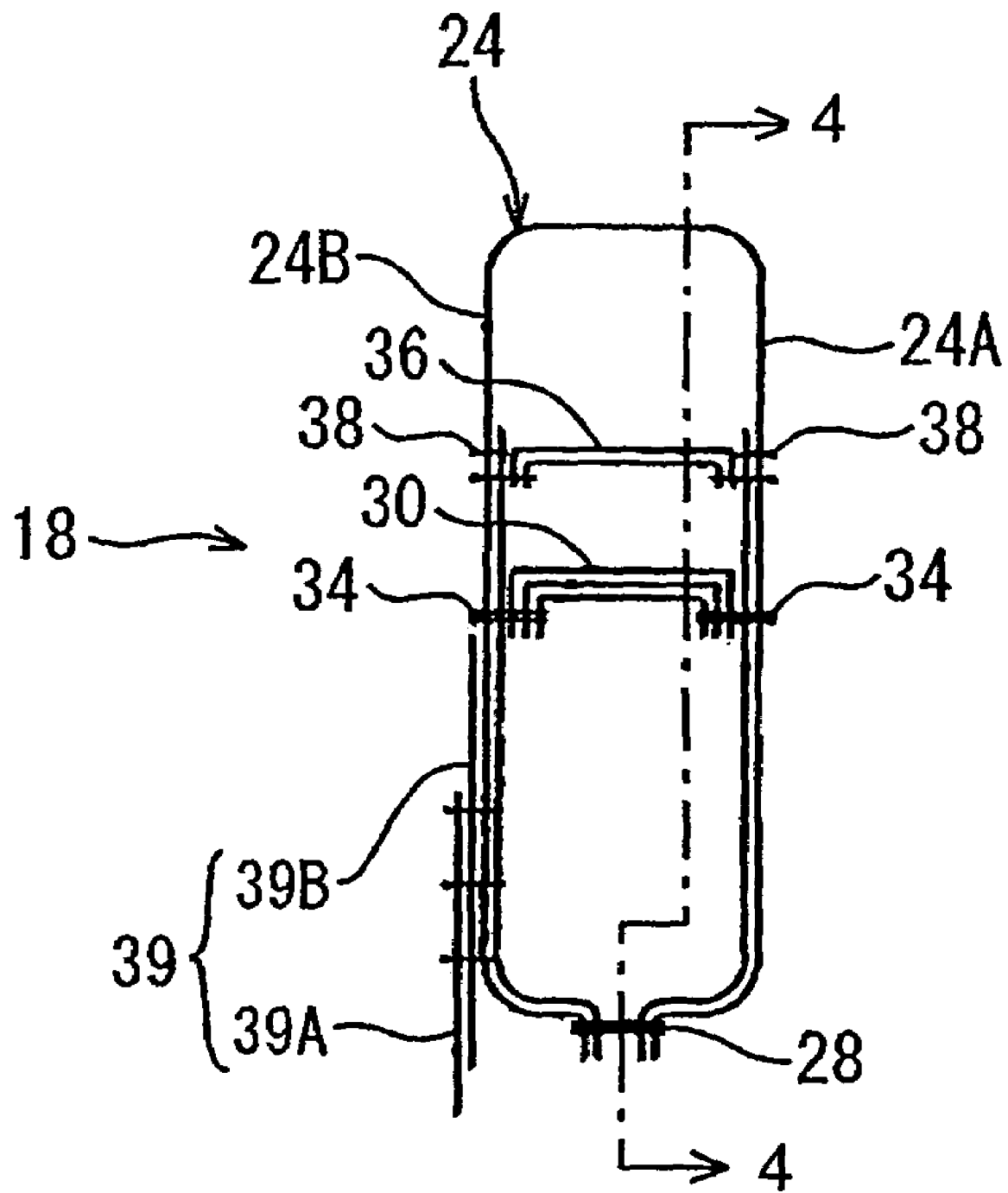
FIG. 3 is a sectional view taken along line 3-3 of FIG. 2.
Figure 4:
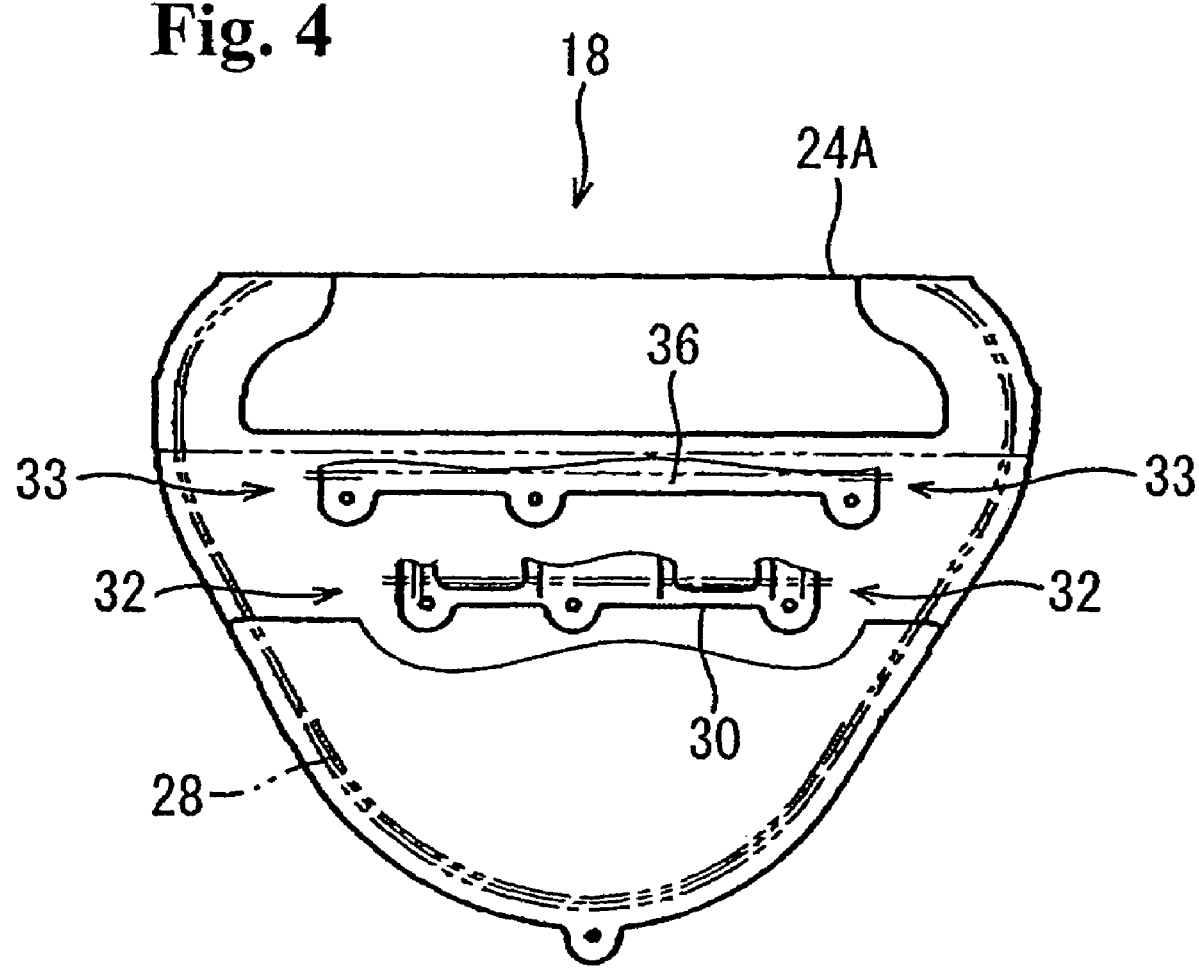
FIG. 4 is a cross-sectional view taken along line 4-4 of FIG. 3.

FIG. 1 is a sectional view of the vicinity in front of a vehicle seat, showing the inflating state of a knee airbag of a leg airbag system according to some of the present disclosure; FIG. 2 is a front view (plan view) of the knee airbag viewed from an interior panel; FIG. 3 is a sectional view taken along line 3-3 of FIG. 2; and FIG. 4 is a cross-sectional views taken along line 4-4 of FIG. 3.

A leg airbag system 14 is mounted to an interior panel 10 serving as an interior trim member in front of a seat 12.

The leg airbag system 14 (an airbag system) includes a container-like retainer 16, a knee airbag 18 (airbag) connected to the interior of the retainer 16, and a gas generator 20 for inflating the knee airbag 18. The retainer 16 is disposed in an opening 10a of the interior panel 10. The knee airbag 18 is usually accommodated in a folded state in the retainer 16. A lid 22 is mounted to the front surface of the retainer 16 such that it covers the knee airbag 18. The lid 22 is usually disposed substantially inside the interior panel 10; when the knee airbag 18 inflates, the lid 22 is open to the front of the interior panel 10 with the upper and lower ends as fulcrum.

The opening 10a is provided at a height equal to or lower than the seating face of the seat 12. The knee airbag 18 inflates upward from below along the front surface of the interior panel 10 (the surface adjacent to the occupant) through the opening 10a at deployment of the airbag.

The outer shell of the knee airbag 18 is constructed of a sheet of panel 24 having an occupant-side front panel 24A and a rear panel 24B adjacent to the interior panel 10. Referring to FIG. 2, the panel 24 is constructed such that the front panel 24A and the rear panel 24B substantially triangular in shape and of the same size are connected together. The panel 24 is folded back at the connecting portion, and respective rims of the front panel 24A and the rear panel 24B, except the connecting portion, are joined together all around with connecting means such as sewing, thereby formed into a bag. Reference numeral 28 indicates a seam of sewing thread or the like that stitches the rims. One surface of the front panel 24A and the rear panel 24B is coated with silicone, which comes inside in the form of a bag.

The knee airbag 18 has two bandlike tethers 30 and 36 sewn therein for preventing an increase in the thickness of the airbag 18 during inflation and deployment. The first tether 30 is disposed upstream of the gas flow from the gas generator 20 (below in FIGS. 1 to 4), whose crosswise opposite ends and the facing inner surfaces of the knee airbag 18 are stitched together with a sewing thread 38. The second tether 36 is disposed downstream of the gas flow (above in FIGS. 1 to 4), whose crosswise opposite ends and the facing inner surfaces of the knee airbag 18 are also stitched with the sewing thread 34. As shown in FIGS. 2 and 4, the first tether 30 and the second tether 36 are disposed substantially in the lateral direction (in the vehicle width direction) of the knee airbag 18 to form a first chamber 18a, a second chamber 18b, and a third chamber 18c in the knee airbag 18 in that order, from the upper stream of the gas flow (see FIG. 1).

Channels 32 and 33 are disposed on the opposite ends of the length of the first tether 30 and the second tether 36, respectively, for carrying the flow of gas from the gas generator 20. The channel 32 allows communication between the first chamber 18a and the second chamber 18b, while channel 33 allows the second chamber 18b to communicate with the third chamber 18c. Although some embodiments comprise two tethers 30, other embodiments comprise at least one channel 30a to allow the gas to flow from the gas generator 20.

The knee airbag 18 has a gas generator housing section 39 at the lower part. The gas-generator housing section 39 includes a housing bag 39A for housing the gas generator 20 and a protective fabric 39B disposed between the housing bag 39A and the rear panel 24B, and is sewn to the knee airbag 18. The housing bag 39A communicates with the knee airbag 18, and has a housing section 39A1 (housing member) for housing the gas generator 20 and a cover 39A2 integrated with the housing section 39A1 for the purpose of improving airtightness of the housing section 39A1 (in other words, to improve the airtightness of the knee airbag 18).

The housing section 39A1 has a slit 40 (insertion opening) for the gas generator 20 to be taken in and out therethrough and an insertion opening 41 for the end of the gas generator 20 adjacent to the connector (not shown) to expose to the exterior after being housed.

A first covering member, cover 39A2, is disposed on one side of the slit 40 (below in FIG. 2), and is folded back from one side toward the slit 40 (upward in FIG. 2) to cover the slit 40 from one side. The insertion opening 41 is operable to keep the airtightness of the knee airbag 18 when the end of the gas generator 20 is passed therethrough.

Similar to the cover 39A2 of the housing bag 39A, the protective fabric 39B has a second covering member, cover 39B1, for increasing the airtightness of the knee airbag 18. A protective portion 39B2 is included that protects the knee airbag 18 from the corner (edge) of the retainer 16 at the time of inflation. The cover 39B1 is disposed on the other side of the slit 40 (above in FIG. 2), and is folded back from the other side toward the slit 40 (downward in FIG. 2) to cover the slit 40 from the other side.

In accommodating the gas generator 20 in this gas-generator housing section 39, the gas generator 20 is first accommodated in the housing section 39A1 of the housing bag 39A through the slit 40. The cover 39B1 of the protective fabric 39B is then folded back toward the slit 40 so as to cover the slit 40. The cover 39A2 of the housing bag 39A is then folded back to the slit 40 so as to further cover the cover 39B1 that covers the slit 40. Thus, the slit 40 is double covered, the covers 39B1 and 39A2 overlapping each other to improve the airtightness of the knee airbag 18. The gas generator housing section 39 is not shown in FIG. 1.

The gas generator 20 is housed in the housing section 39A1 of the housing bag 39A with the axis of cylinder substantially in the vehicle width direction in a state in which it is retained by a metallic gas-generator retaining member 37 (a retaining member, see FIG. 1). The gas generator 20 generates a jet of gas by a reaction of a gas generating agent using heat from ignited powder. The ignition is controlled by a control unit (not shown) connected to the gas generator 20 via the connector and a cable (not shown).

As shown in FIG. 1, stud bolts 20a (fixing members) project from the side circumferential surface of the gas-generator retaining member 37 that retains the generator 20. The stud bolts 20a are passed through bolt insertion openings 42 (openings) in the housing section 39A1 and the cover 39A2 of the housing bag 39A and the cover 39B1 of the protective fabric 39B and a bolt insertion opening (not shown) in the bottom of the retainer 16. Nuts 20b are tightened on the bolts 20a to fix the gas generator 20 and the gas generator retaining member 37 to the retainer 16. The rear panel 24B of the knee airbag 18 and the gas-generator housing section 39 (particularly, the covers 39A2 and 39B1) are retained to the retainer 16 in such a manner as to be clamped between the gas generator 20 and the gas-generator retaining member 37 and the bottom of the retainer 16.

Although not particularly described, the first tether 30, the second tether 36, and the gas-generator housing section 39 are made of the same material as that of the knee airbag 18 and the panel 24.

The leg airbag system 14 is configured to activate the gas generator 20 in a vehicle collision in order to generate gas for inflating knee airbag. The gas is supplied into the first chamber 18a to inflate the first chamber 18a. At that time, the inflation of the first chamber 18a allows the lid 22 to open to both sides. The gas in the first chamber 18a flows into the second chamber 18b through the channels 30a of the first tether 30 and the channels 32 to inflate the second chamber 18b. The gas in the second chamber 18b then flows into the third chamber 18c through the channels 33 to inflate the third chamber 18c. Thus, the knee airbag 18 is inflated and deployed.

The leg airbag system 14 of the embodiment with this construction and operation has the following advantages.

The gas generator 20 is housed in the housing section 39A1 of the housing bag 39A through the slit 40, and then the cover 39B1 of the protective fabric 39B is folded back to the slit 40 to cover the slit 40, and the cover 39A2 of the housing bag 39A is folded back to the slit 40 to further cover the cover 39B1 that doubly covers the slit 40. In this way, the slit 40 of the housing section 39A1 that house the gas generator 20 is covered with the covers 39B1 and 39A2 to improve the airtightness of the knee airbag 18. This prevents gas from leaking through the slit 40 during inflation and deployment of the knee airbag 18, thereby improving the deployment performance of the knee airbag 18. Furthermore, since the knee airbag 18 can be deployed by the relatively low-output gas generator 20, the gas generator 20 can be made compact.

The leg airbag system 14 utilizes the slit 40 as an insertion opening to put in and out the gas generator 20 from the housing section 39A1. The slit-shaped insertion opening is expanded at the insertion of the gas generator 20 to provide sufficient opening to pass the gas generator 20 therethrough, and is closed after the insertion to minimize the opening space, thereby preventing a decrease in the tightness of the knee airbag 18.

In the leg airbag system 14, the cover 39A2 is disposed on one side of the slit 40, and the cover 39B1 is disposed on the other side of the slit 40. After the gas generator 20 is housed in the housing section 39A1 through the slit 40, the slit 40 is covered with the cover 39B1 from the other side, and is then covered with the cover 39A2 from one side. The covering of the slit 40 with the covers 39A2 and 39B1 from both sides further increases the airtightness of the knee airbag 18.

This embodiment is constructed such that the slit 40 is doubly covered with the covers 39A2 and 39B1 overlapping each other. This further increases the airtightness of the airbag.

As described above, the leg airbag system 14 is constructed such that the housing section 39A1 and the cover 39A2 are integrated with each other and the cover 39B1 and the protective portion 39B2 are integrated with each other. This construction can reduce the number of components and simplifies the manufacturing process in comparison with a case in which the components are manufactured separately.

The leg airbag system 14 of the embodiment is constructed such that the covers 39A2 and 39B1 are made of the same material as that of the knee airbag 18. This facilitates fixing of the covers 39A2 and 39B1 to the knee airbag 18, for example, by sewing. Also, this enables the knee airbag 18 to be folded together with the covers 39A2 and 39B1 and housed in the retainer 16, with the covers 39A2 and 39B1 fixed to the knee airbag 18.

The leg airbag system 14 has the separate gas-generator housing section 39 for housing the gas generator 20 in the knee airbag 18. This enables replacement of the gas generator 20 through the slit 40 even after the airbag is sewn, as opposed to related art in which the airbag is manufactured in such a way that the gas generator is housed in the airbag and then the rim is sewn, preventing the gas generator from being taken out after the bag is sewn up.

As described above, the leg airbag system 14 is constructed such that when the gas generator 20 and the gas-generator retaining member 37 is housed in the housing bag 39A, the stud bolts 20a secured to the gas-generator retaining member 37 are passed through bolt insertion openings (not shown) in the housing section 39A1 and the cover 39A2 of the housing bag 39A and the cover 39B1 of the protective fabric 39B and the bolt insertion openings (not shown) in the bottom of the retainer 16. On the bolts 20a, nuts 20b are tightened to fix the gas-generator retaining member 37 to the retainer 16. This fixing of the gas-generator retaining member 37 to the retainer 16 enables the covers 39A2 and 39B1 that cover the slit 40 to be clamped between the gas-generator retaining member 37 and the retainer 16 and to be pushed against the slit 40. This further improves the airtightness of the knee airbag 18.

While some aspects has been described with the airbag 18 containing two tethers as an example, the invention is not limited to that. The invention may be applied to an airbag having more tethers and an airbag having no tether. This also offers the same advantages.

While some aspects may include an airbag system using a gas generator 20 that generates high-temperature gas using powder, this aspect is non-limiting. Other embodiments of the airbag system may include a gas generator that generates high-pressure gas such as argon and offers the same advantages.

While the disclosures described include a leg airbag system in which an airbag inflates forward of occupants' legs in a collision, the present disclosure is non-limiting. The invention may be applied to various airbag systems for restraining occupants' bodies in a car collision, such as a driver airbag system that inflates and deploys from the rotation center of the steering wheel toward a driver in a driver seat and a passenger airbag that inflates and deploys from the instrument panel toward a passenger seat.

The disclosure of Japanese Patent Application No. 2005-309235 filed on Oct. 25, 2005 is incorporated as a reference.

What is claimed is:

1. An airbag system comprising:
   an airbag configured to restrain an occupant,
   a gas generator that generates a jet of gas to inflate the airbag,
   an insertion opening disposed on the airbag operable to receive the gas generator, and
   a covering member that covers the insertion opening from an exterior of the airbag, said covering member having a first covering member at one side thereof for covering the insertion opening and a protective portion at the other side thereof, said protective portion having a lateral size greater than that of the first covering member for protecting the airbag.

2. An airbag system comprising:
   an airbag configured to restrain an occupant,
   a gas generator that generates a jet of gas to inflate the airbag,
   a housing member communicating with the airbag and configured to house the gas generator, said housing member having an insertion opening to receive the gas generator therethrough, and
   a covering member that covers the insertion opening from an exterior of the housing member, said covering member having a first covering member at one side thereof for covering the insertion opening and a protective portion at the other side thereof, said protective portion having a lateral size greater than that of the first covering member for protecting the airbag.

3. An airbag system according to claim 1, wherein the insertion opening is a slit formed at the airbag.

4. An airbag system according to claim 2, wherein the insertion opening is a slit formed at the housing member.

5. An airbag system according to claim 2, wherein the housing member includes a second covering member disposed on one side of the insertion opening opposite to the first covering member.

6. An airbag system according to claim 5, wherein the first and second covering members overlap each other so as to cover the insertion opening twice.

7. An airbag system according to claim 1, wherein the covering member is a fabric made of a material same as or equivalent to that of the airbag.

8. An airbag system according to claim 2, wherein the covering member is a fabric made of a material same as or equivalent to that of the airbag.

9. An airbag system according to claim 1, further comprising:
   a retaining member configured to retain the gas generator when the gas generator is housed in the airbag;
   wherein the retaining member is fixed to a retainer in such a manner that a fixing member, secured to the retaining member, is tightened upon being passed through openings provided on the airbag, the covering member, and the retainer in a protruded condition.

10. An airbag system according to claim 2, further comprising:
    a retaining member configured to retain the gas generator when the gas generator is housed in the housing member;
    wherein the retaining member is fixed to a retainer in such a manner that a fixing member, secured to the retaining member, is tightened upon being passed through openings provided on the airbag, the housing member, the covering member, and the retainer in a protruded condition.

11. An airbag system according to claim 6, wherein said protective portion of the covering member is disposed between the housing member and the airbag.

* * * * *